Patented Dec. 12, 1933

1,939,186

UNITED STATES PATENT OFFICE 1,939,186

TREATING WOOD FOR INTERIORS

Herman C. Nielsen, Howard City, Mich., assignor to National Wood Products Company, Detroit, Mich., a corporation of Delaware No Drawing. Application May 23, 1930
Serial No. 455,146

3 Claims. (Cl. 91—68)

The present invention relates to process and composition for impregnating wood, which is particularly applicable in the case of impregnating flooring, interior trim in buildings such as wainscotting, doors, wood to be used in making furniture, and the like, which is subsequently to be varnished, shellaced or lacquered.

A further object of the invention is the employment of a composition which will completely impregnate the wood at relatively low temperatures such as 125 to 150° F. The impregnation under these conditions will be sufficiently complete in 1 to 8 hours depending upon the particular kind of wood and the size or thickness of the wood. In some cases the impregnation will be sufficiently complete in half an hour.

The wood after being taken out of the impregnation solution, and preferably after drying for a short period can be planed or sandpapered if desired, and then is ready to receive any kind of a surface coating such as lacquer, varnish, shellac, paint and the like. These coatings will adhere well to the treated wood.

The wood is fully protected against wet and dry rot, against moisture, and the wood so treated will not shrink or swell or check or curl, but becomes permanent under all of the usual conditions encountered in service, such as changes in the temperature and moisture content of the surrounding atmosphere, washing with water, soapy water and the like, such as are commonly used for washing up floors, and the surface finish is not injured by waxing or similar compositions which are frequently applied to floors and the like.

The following formula is given by way of illustration, but it is to be understood that the proportions of the ingredients can be varied somewhat as indicated in the parentheses in the table, and in some cases even greater variation is permissible.

| | |
|---|---|
| Fish oil (preferably menhaden) | 22 parts (18 to 26) |
| Spirits of turpentine (preferably distilled gum turpentine) | 22 parts (20 to 25) |
| Lubricating mineral oil (preferably "medium" automobile oil) | 22 parts (16 to 24) |
| Mineral turpentine substitute (e. g. "oleum spirits") | 22 parts (20 to 28) |
| Oleic acid (e. g. "red oil") | 4 parts (2 to 5) |
| Calcium chloride (fine powder) | 2 parts (1 to 3) |
| Scenting oil (e. g. oil of citronella) | 2 parts (1 to 3) |
| Oil-soluble dye (any color-optional) | 1 part (0.1 to 2) |

It will be understood that in place of distilled gum turpentine, purified distilled wood turpentine can be employed, although less advantageously.

Calcium chloride is, as well known, not readily soluble in most oily materials. However in the presence of oleic acid, and possibly in the presence of a small amount of moisture ordinarily present in some of these materials, or absorbed from the atmosphere, it does dissolve. The solution may not be entirely homogeneous, but during the treatment the liquid is preferably kept agitated to a considerable extent. The treatment can be effected in either open or closed tanks, preferably at a temperature around 135 to 140° F., although temperatures from 125 to 150 can be used.

Mineral turpentine substitutes generally known in the art of paint manufacture as "oleum or mineral spirits", are volatile products resembling turpentine in their properties, as described in my co-pending application, Serial No. 347,174, filed March 14, 1929. In the present instance, these turpentine substitutes are employed because of their evaporating and drying properties and because they aid in securing penetration of other ingredients into the wood fibers.

Most kinds of fish oil, including menhaden oil has a more or less disagreeable smell, which is largely or completely overcome by the small amount of a scenting material such as oil of citronella. Oil of sassafras, oil of cedar or certain other scenting agents can be employed.

The oil-soluble dye can be used or not as desired. Various colors such as blue, red, green, brown, yellow, black, purple, and mixtures of colors can be employed, to give any desired color to the wood. It is noted that the impregnating composition goes completely through the wood, as illustrated by a drawing of treated blocks or pieces of the treated wood.

The wood may be treated in the form of boards, blocks or the like, and very satisfactory results have been secured in treating pieces which are from three-quarters of an inch up to about two inches in thickness (smallest dimension). Pieces so treated, when subsequently sawed through the center show the impregnating material to be carried clear to the center of the wood, and the color will persist as long as any of the wood remains, as distinguished from any surface staining, which stains merely the surface or very slightly below the surface.

It is found that impregnation of the wood with the above mentioned mixture hardens the wood making the same 20 to 50% harder than the untreated wood. The wood is not only waterproofed, but is to some extent fireproofed by the treatment, as shown by the fact that the treated wood is less readily inflammable than the untreated.

I regard it as surprising that clear transparent coatings such as lacquer (nitrocellulose base), shellac and varnish will adhere readily and firmly to the treated wood, without showing any signs of separation or peeling.

Other materials can be added if desired, for example gloss oil, orthodichlorbenzene, manganese drying oil, made by cooking or drying oil such as linseed oil with manganese dioxide or other oxidizing agent, as described in my copending application 347,174, now Patent No. 1,886,716, Nov. 8, 1932. Small amounts of gums, rosins, and the like can also be added to the composition if desired.

It is also important to note that after impregnation with the said composition, there is no bleeding of the composition during changes in temperature.

I claim:—

1. A process of treating wood for interiors of buildings, which comprises impregnating same with a mixture including—

|  | Parts |
|---|---|
| Fish oil | about 22 |
| Turpentine | about 22 |
| Mineral lubricating oil | about 22 |
| Mineral turpentine substitute | about 22 |
| Oleic acid | about 4 |
| Calcium chloride | about 2 |
| Scenting material | about 2 | and thereafter applying a coating of a substantially transparent coating composition which dries and hardens.

2. A wood suitable for interior finish impregnated with a material comprising fish oil and mineral lubricating oil, the wood having a coating of lacquer firmly adherent thereto.

3. A wood suitable for interior finish impregnated with a composition consisting primarily of fish oil, turpentine, mineral lubricating oil, turpentine substitutes and small amounts of oleic acid and calcium chloride, the wood having a firmly adherent coating of lacquer.

HERMAN C. NIELSEN.